(12) United States Patent  
Lewin et al.

(10) Patent No.: US 7,195,832 B2  
(45) Date of Patent: Mar. 27, 2007

(54) FUEL CELLS

(75) Inventors: Robert Glynn Lewin, Springfields Works (GB); Stephen Vernon Barnett, Springfields Works (GB)

(73) Assignee: British Nuclear Fuels PLC, Cheshire (GB)

( * ) Notice: Subject to any disclaimer, the term of this patent is extended or adjusted under 35 U.S.C. 154(b) by 380 days.

(21) Appl. No.: 10/399,433

(22) PCT Filed: Oct. 18, 2001

(86) PCT No.: PCT/GB01/04631

§ 371 (c)(1),  
(2), (4) Date: Aug. 12, 2003

(87) PCT Pub. No.: WO02/33770

PCT Pub. Date: Apr. 25, 2002

(65) Prior Publication Data

US 2004/0028990 A1 Feb. 12, 2004

(30) Foreign Application Priority Data

Oct. 19, 2000 (GB) .................................. 0025661.0

(51) Int. Cl.  
*H01M 8/10* (2006.01)  
*H01M 4/86* (2006.01)

(52) U.S. Cl. .............................. 429/31; 429/32; 429/44

(58) Field of Classification Search ................. 429/31, 429/32, 34, 44  
See application file for complete search history.

(56) References Cited

U.S. PATENT DOCUMENTS

| 4,621,033 | A | | 11/1986 | Tsutsumi et al. |
| 4,670,360 | A | | 6/1987 | Habermann et al. |
| 4,774,153 | A | | 9/1988 | Sterzel |
| 4,833,045 | A | * | 5/1989 | Pollack et al. ............ 429/31 X |
| 5,336,570 | A | | 8/1994 | Dodge, Jr. |
| 5,660,941 | A | | 8/1997 | Farooque et al. |
| 5,827,620 | A | | 10/1998 | Kendall |
| 5,863,673 | A | * | 1/1999 | Campbell et al. ............. 429/44 |

FOREIGN PATENT DOCUMENTS

| DE | 34 30 485 A1 | 2/1986 |
| GB | 2 293 916 A | 4/1996 |
| JP | 9-245822 | 9/1997 |
| WO | WO 99/17390 | 4/1999 |

* cited by examiner

*Primary Examiner*—Stephen J. Kalafut  
(74) *Attorney, Agent, or Firm*—Workman Nydegger

(57) ABSTRACT

A method of production and apparatus for a fuel cell having three nested truncated cones. The inner cone is made of a porous metal sponge, such as nickel, and provides a media through which fuel can pass. The second cone is provided around the inner cone in use, and acts as a diffuser for the fuel to promote efficient contact with the third cone. The third cone is the fuel cell itself and includes an electrolyte component which provides a gas impermeable layer between fuel and oxidation sides of the cell. A cathode and anode are provided on outer and inner surfaces respectively of the electrolyte component. The fuel cell is configured such that the lower surface of the fuel cell has a cross-sectional profile of greater area than the top surface. The top surface has an aperture allowing fuel to exit the diffuser cone.

19 Claims, 2 Drawing Sheets

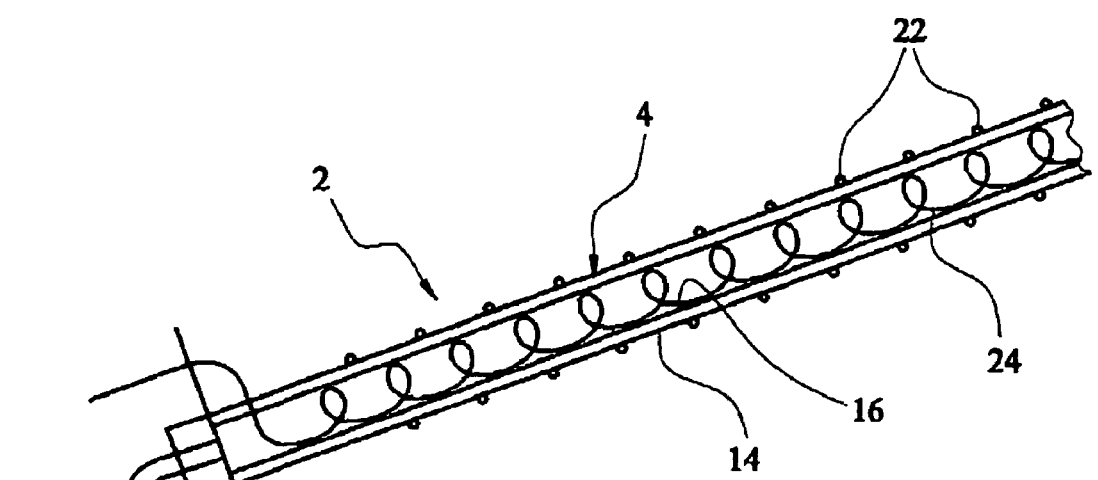
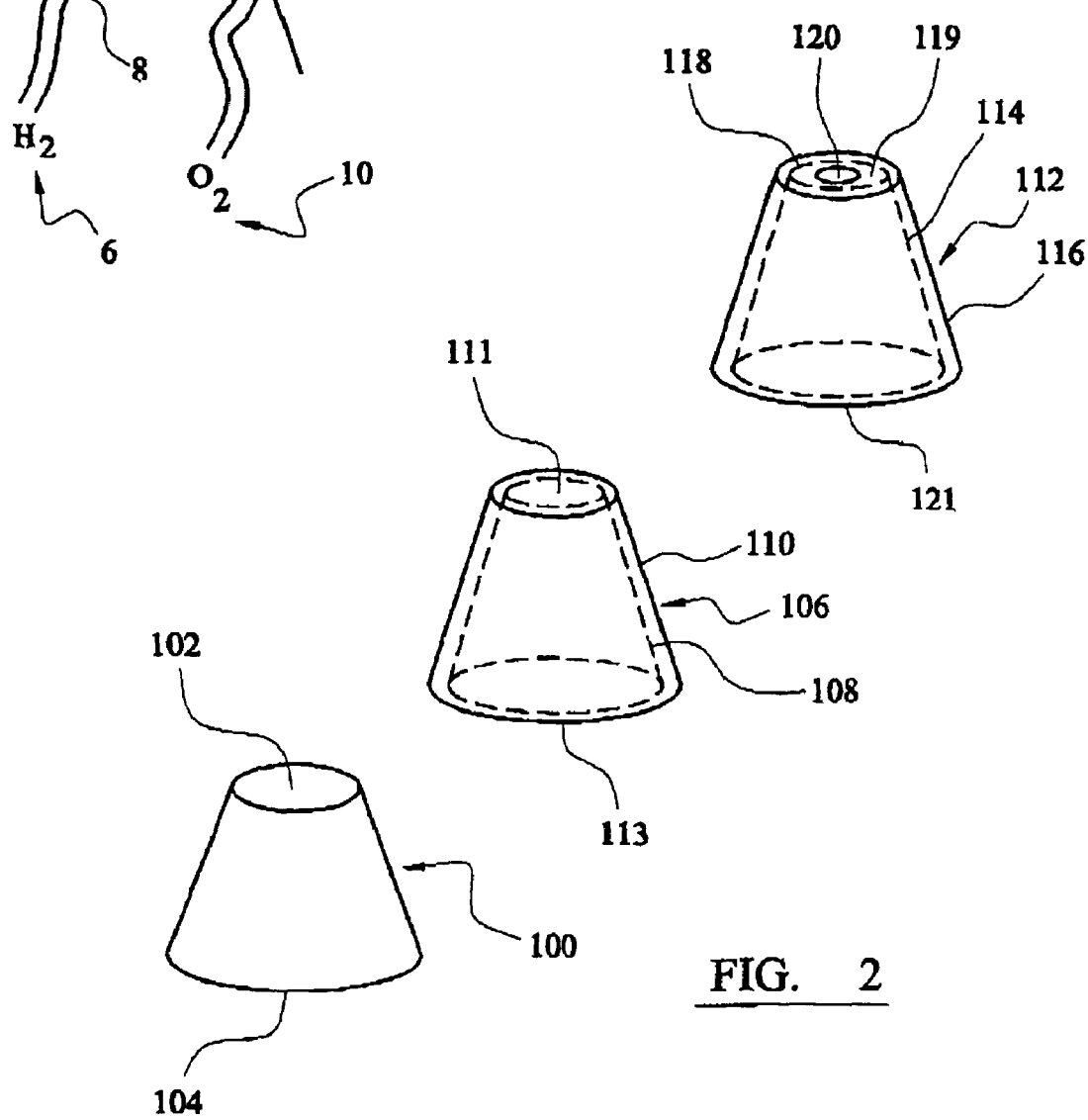

FUEL CELLS

FIELD OF THE INVENTION

This invention concerns improvements in and relating to fuel cells, particularly, but not exclusively to their structure and method of construction.

RELATED TECHNOLOGY AND SUMMARY OF THE INVENTION

Fuel cells produce electrical energy by consumption of fuel at an anode and of an oxidant at a cathode. For the electrochemical reaction to occur at a meaningful rate such fuel cells are generally operated at temperatures in excess of 850° C. Whilst planar fuel cells are known, circular cross-section long tubular fuel cells are believed to offer superior resistance to thermal shook; that is to say rapid changes in temperature do not result in large scale damage to the fuel cell. This is an important attribute in real world systems. Circular cross-sectioned long tubular fuel cells have fuel fed to their inside and the oxidant to their outside.

The applicant has established that such circular cross-sectioned long tubular designs offer relatively poor current levels and have found that this is in the large part due to the difficulty in producing a good contact between the external surface of the tube and the current collector, and even more so, between the internal surface of the tube and a current collection system for that surface.

The present invention has amongst its aims to provide a fuel cell which can be effectively assembled, is not costly to produce and offers a wide variety of practical uses.

According to a first aspect of the present invention we provide a fuel cell, the fuel cell including an electrolyte component, a first electrode component contacting a first side of the electrolyte component and a second electrode component contacting a second side of the electrolyte component, wherein at least one of the components has a first cross-sectional profile at a first location and a second cross-sectional profile at a second location, the second location being separated from the first location, the first cross-sectional profile having a greater area than the second cross-sectional profile, the first and second cross-sectional profiles being linked by one or more surfaces of the component.

The first aspect may include any of the features, options or possibilities set out elsewhere in this document. In particular reference is made to the features, options and possibilities for the electrolyte component and/or first electrode component and/or second electrode component set out in the second and/or third aspect of the invention.

According to a second aspect of the present invention we provide a fuel cell, the fuel cell including an electrolyte component, a first electrode component contacting a first side of the electrolyte component, a fuel electrically conductive component contacting the first side of the electrolyte component and/or the first electrode component and a second electrode contacting a second side of the electrolyte component, a second electrically conductive component contacting the second side of the electrolyte component and/or the second electrode component, wherein at least one of the components has a first cross-sectional profile at a first location and a second cross-sectional profile at a second location, the second location being separated from the first location, the first cross-sectional profile having a greater area than the second cross-sectional profile, the first and second cross-sectional profiles being linked by one or more surfaces of the component.

Preferably the electrolyte component is provided according to the features, options or possibilities set out elsewhere in the document, including in particular the third aspect of the invention.

Preferably the first electrode component is provided according to the features, options or possibilities set out elsewhere in this document, including in particular the third aspect of the invention. Preferably the second electrode component is provided according to the features, options or possibilities set out elsewhere in this document, including in particular the third aspect of the invention.

One of the first or second electrically conductive components, preferably the second, nay be provided according to the features, options or possibilities set out elsewhere in this document, including in particular the third aspect of the invention, and more particularly the porous electrically conductive component provided therein. The other of the first or second electrically conductive components, preferably the first, may be provided according to the features, options or possibilities sot out elsewhere in this document, including in particular the fourth aspect of the invention, and more particularly the porous electrically conductive link component provided therein.

Preferably the second cross-sectional profile is within or corresponds to a projection of the first cross sectional profile, particularly when parallel first and second cross sectional profiles are considered. Preferably separation along an axis is considered. Preferably the first and second cross sectional profiles are perpendicular to the axis. The axis preferably corresponds to the direction of insertion of one component into another component. The axis may join centres of the first and second cross sectional profiles. It is particularly preferred that the second cross sectional profile be a reduced scale version of the first cross sectional profile.

The second electrode component is preferably provided inside the electrolyte component in contact with the electrolyte component. The first electrode component is preferably provided outside the electrolyte component in contact with the electrolyte component.

Preferably the second electrically conductive component is provided inside the electrolyte component in contact with the electrolyte component and/or the second electrode. Preferably the first electrically conductive component is provided outside the electrolyte component in contact with the electrolyte component and/or the first electrode.

Preferably a porous material component is provided inside the second electrically conductive component, ideally in contact with the second electrically conductive component. Preferably the porous material component is provided according to the features, options or possibilities set out elsewhere in this document, including in particular the third aspect of the invention, and more particularly the porous material component provided therein.

Preferably the outer surface of the electrolyte component has a first cross-sectional profile at a first location and a second cross-sectional profile at a second location separated from the first, the first cross-sectional profile having a greater area than the second cross-sectional profile, the first and second cross-sectional profiles being linked by one or more surfaces of the component. Preferably the inner surface of the first electrically conductive component has a first cross-sectional profile at a first location and a second cross-sectional profile at a second location separated from the first, the first cross-sectional profile having a greater area than the second cross-sectional profile, the first and second cross-sectional profiles being linked by one or more surfaces of the component. It is particularly preferred that the outer surface of the electrolyte component and the inner surface of the first electrode component and/or the inner surface of the first electrically conductive component correspond with one another, and ideally abut each other.

Preferably the inner surface of the electrolyte component has a first cross-sectional profile at a first location and a second cross-sectional profile at a second location separated from the first, the first cross-sectional profile having a greater area than the second cross-sectional profile, the first and second cross-sectional profiles being linked by one or more surfaces of the component. Preferably the outer surface of the second electrically conductive component has a first cross-sectional profile at a first location and a second cross-sectional profile at a second location separated from the first, the first cross-sectional profile having a greater area than the second cross-sectional profile, the first and second cross-sectional profiles being linked by one or more surfaces of the component. It is particularly preferred that the inner surface of the electrolyte component and the outer surface of the second electrode component and/or the outer surface of the second electrically conductive component correspond with one another, and ideally abut each other.

Preferably the inner surface of the second electrically conductive component has a first cross-sectional profile at a first location and a second cross-sectional profile at a second location separated from the first, the first cross-sectional profile having a greater area than the second cross-sectional profile, the first and second cross-sectional profiles being linked by one or more surfaces of the component. Preferably the outer surface of the porous material component has a first cross-sectional profile at a first location and a second cross-sectional profile at a second location separated from the first, the first cross-sectional profile having a greater area than the second cross-sectional profile, the first and second cross-sectional profiles being linked by one or more surfaces of the component. It is particularly preferred that the inner surface of the second electrically conductive component and the outer surface of the porous material component correspond with one another, and ideally abut one another.

Preferably at least two, more preferably three, and ideally all four of the electrolyte component, second electrode component, second electrically conductive component and porous material component have matching end surfaces at one end.

The second aspect of the invention may include any of the features, options or possibilities set out elsewhere in this document.

According to a third aspect of the present invention we provide a component for a fuel cell the component having a first cross-sectional profile at a first location and a second cross-sectional profile at a second location, the second location being separated from the first, the first cross-sectional profile having a greater area than the second cross-sectional profile, the first and second cross-sectional profiles being linked by one or more surfaces of the component.

The first and second cross-sectional profiles may both be internal profiles. The first and second cross-sectional profiles may both be external profiles.

The first and second cross-sectional profiles are preferably parallel to one another. The first and/or second cross-sectional profiles are preferably perpendicular to the axis.

The first cross-sectional profile is preferably at one end of the component. The second cross-sectional profile is preferably at the other end of the profile. The second cross-sectional profile may be provided intermediate the ends of the component, particularly in the case of an external profile and/or where the component has an end portion.

One or both cross-sections may be symmetrical, preferably about more than one line of symmetry. Preferably the second cross-sectional profile corresponds to the first cross-sectional profile at a reduced scale. One or both cross-sections may be circular in profile. One or both cross-sections may be square in profile. One or both cross-sections may be rectilinear, particularly rectangular, in profile. Preferably both cross-sections have the same shape profile.

Preferably the first and second cross-sectional profiles are separated from one another along an axis of the component. The axis of the component is preferably the axis extending from the apex, or projected apex of the component. The axis of the component may be the line formed by joining the centre of the first and second cross-sectional profiles, potentially together with the centre of other intermediate cross-sectional profiles.

The first cross-sectional profile is preferably linked to the second cross-sectional profile by a single surface. The first cross-sectional profile may be linked to the second cross-sectional profile by three surfaces. The firs cross-sectional profile maybe linked to the second cross-sectional profile by four surfaces. The link may be provided by more than four surfaces in some cases. The linking surface may be conical in shape, more preferably a truncated conical shape. Preferably the truncation is perpendicular to the axis. The linking surfaces may be the same or different in shape. The linking surfaces may be triangular in shape, or more preferably trapezoidal. Preferably the two sides of the trapezoid separated in the axial direction are parallel to one another and the other two sides are inclined with respect to one another.

One or more of the linking surfaces may effect the link by a transition from the part of the first cross-sectional profile they define to the part of the second cross-sectional profile they define.

The linking surface may provide the transition in a constant manner from the first cross-sectional profile to the second cross-sectional profile. The linking surface may provide the transition from the first cross-sectional profile to the second cross-sectional profile throughout the separation of the first and second cross-sectional profiles. The linking surface or surfaces preferably under go a transition towards the second cross-sectional profile or maintain their profile throughout the linking surface.

The linking surface may be angled relative to the axis, with an interception angle of between 1° and 65°, more preferably between 50° and 50° and ideally between 10° and 40°. Preferably each linking surface is provided at the same angle.

Preferably each part of the second cross-sectional profile is within or corresponds to the projection of the first cross-sectional profile in the direction of the axis.

The component may be an electrolyte component. The electrolyte component may be formed of zirconia, particularly zirconia doped with yttria. The electrolyte component is preferably a mixed oxide. The electrolyte component preferably allows the passage of gas ions, but is impervious to hydrogen and oxygen.

Preferably the electrolyte component has matching inner and outer surfaces. Preferably the separation between the first cross-sectional profiles of the outer surface and inner surface is the same all around the profiles. Preferably the separation between the second cross-sectional profiles of the outer surface and inner surface is the same all around the profiles. Preferably the separation is the same between the first cross-sectional profiles of the outer surface and inner surface as between the second cross-sectional profiles of the outer surface and inner surface. The separation may be between 5 micron and 300 micron. Preferably the linking surface or surfaces have a constant separation between the first cross-sectional pro file and the second. Preferably the linking surface or surfaces are parallel to one another between the first cross-sectional profile and the second.

Preferably the electrolyte component is conical, ideally a truncated cone. The truncation at both ends may pass through both the outside and inside walls of the component. The truncation closest to the second cross-sectional profile may only pass through the outside wall. The truncation closest to the second cross-sectional profile may pass through one or more apertures in an end portion of the component. The end portion may be a disc shaped portion, preferably extending across the top of the truncated cone. Preferably the component has an opening at both ends. Preferably a single aperture is provided at each end. Preferably the end surfaces of the component, particularly the truncation surfaces, are parallel with one another.

The component may be a first and/or second electrode component.

Preferably the first and/or second electrode component has matching inner and outer surfaces. Preferably the separation between the first cross-sectional profiles of the outer surface and inner surface is the same all around the profiles. Preferably the separation between the second cross-sectional profiles of the outer surface and inner surface is the same all around the profiles. Preferably the separation is the same between the first cross-sectional profiles of the outer surface and inner surface as between the second cross-sectional profiles of the outer surface and inner surface. Preferably the linking surface or surfaces have a constant separation between the first cross-sectional profile and the second. Preferably the linking surface or surfaces are parallel to one another between the first cross-sectional profile and the second.

Preferably the first and/or second electrode component is conical, ideally a truncated cone. The truncation at both ends may pass through both the outside and inside walls of the component. Preferably the truncation closest to the second cross-sectional profile only passes through the outside wall. Preferably the remainder of the truncation passes through an end portion of the component. The end portion may be a disc shaped portion, preferably extending across the top of the truncated cone. Preferably the component has an opening at the end closest to the first cross-sectional profile. Preferably the end surfaces of the component, particularly the truncation surfaces, are parallel with one another.

The component may be a second, preferably porous, electrically conductive component, such as a roam, mesh, porous shaped solid metal or felt material. A metal foam or felt, such as a nickel foam or felt, is particularly preferred. Preferably the component is porous to a fuel material, such as hydrogen. Preferably the component acts as a diffuser. Preferably the material of this component is compressible and resilient.

Preferably the porous electrically conductive component has matching inner and outer surfaces. Preferably the separation between the first cross-sectional profiles of the outer surface and inner surface is the same all around the profiles. Preferably the separation between the second cross-sectional profiles of the outer surface and inner surface is the same all around the profiles. Preferably the separation is the same between the first cross-sectional profiles of the outer surface and inter surface as between the second cross-sectional profiles of the outer surface and inner surface. The separation may be between 1 mm and 8 mm. Preferably the linking surface or surfaces have a constant separation between the first cross-sectional profile and the second. Preferably the linking surface or surfaces are parallel to one another between the first cross-sectional profile and the second.

Preferably the porous electrically conductive component is conical ideally a truncated cone. The truncation at both ends nay pass through both the outside and inside walls of the component. Preferably the truncation closest to the second cross-sectional profile only passes through the outside wall. Preferably the remainder of the truncation passes through an end portion of the component. The end portion may be a disc shaped portion, preferably extending across the top of the truncated cone. Preferably the component has an opening at the end closest to the first cross-sectional profile. Preferably the end surfaces of the component, particularly the truncation surfaces, are parallel with one another.

The component may be a porous material component, such as a mesh material. A metal mesh, such as a nickel mesh, is particularly preferred. The component may be formed of an electrical conductors. Preferably the component is porous to a fuel material, such as hydrogen. Preferably the material this component is compressible and resilient.

Preferably the porous material component has an outer surface and no inner surface, particularly because the component has a solid core. The porous material may have an inner surface and an outer surface. The separation between the first cross-sectional profiles of the outer surface and inner surface may be the same all around the profiles. The separation between the second cross-sectional profiles of the outer surface and inner surface may be the same all around the profiles. The separation may be the same between the first cross-sectional profiles of the outer surface and inner surface as between the second cross-sectional profiles of the outer surface and inner surface. Preferably the linking surface or surfaces have a constant separation between the first cross-sectional profile and the second. Preferably the linking surface or surfaces are parallel to one another between the first cross-sectional profile and the second.

Preferably the porous material component is conical, ideally a truncated cone. The truncation at both ends may pass through only the outside wall of the component. The truncation closest to the second cross-sectional profile may only pass through the outside wall. Preferably the end surfaces of the component, particularly the truncation surfaces, are parallel with one another.

According to a fourth aspect of the present invention we provide an array of fuel cells the array including one or more fuel cells according to the first and/or second and/or third aspects of the invention connected to one or more further fuel cells.

The fuel calls, particularly through their outer surfaces, may be connected together by a porous electrically conductive link component. The porous electrically conductive link component is preferably porous to the passage of the oxidant, particularly oxygen. The porous electrically conductive link component may be a metal alloy, particularly a nickel chrome alloy. The porous electrically conductive link component may be provided as a mesh. The porous electrically conductive link component may be an integral body of material. Preferably the porous electrically conductive link component is provided with one or more tapering, ideally conical, openings therein. The openings may be recesses, but are preferably through apertures. Preferably the apertures have a maximum dimension perpendicular to their axis which is less than the maximum dimension of the fuel cell perpendicular to its axis. Preferably the apertures have a maximum diameter perpendicular to their axis which is less than the maximum diameter of the fuel cell perpendicular to its axis. Preferably the apertures have a minimum dimension perpendicular to their axis which is greater than the minimum dimension of the fuel cell perpendicular to its axis. Preferably the apertures have a minimum diameter perpendicular to their axis which is greater than the maximum diameter of the fuel cell perpendicular to its axis. The porous electrically conductive link component is preferably planar.

The porous electrically conductive link component may connect the fuel cells in parallel. The porous electrically conductive link component may connect the fuel cells in series.

Preferably the porous electrically conductive link component has an oxidant feed side and an exhaust side. Preferably the oxidant flows from the oxidant feed side to the exhaust side through the porous electrically conductive link component. The oxidant is preferably introduced to the porous electrically conductive link component via one or more conduits. A forcing unit may be provided to feed the oxidant through the porous electrically conductive link component. The forcing unit may be a fan. The oxidant may fed through the porous electrically conductive link component by convection.

Preferably the fuel is introduced from the same side as the oxidant. Preferably the fuel flows from the oxidant feed side to the exhaust side through a fuel cell. The fuel preferably flows through the porous material component, ideally the core, of the fuel cell and/or through the porous electrically conductive component, ideally the porous diffuser, of the fuel cell. Preferably the fuel exits the fuel cell through one or more apertures therein. The apertures may be blocked or obscured in part. The aperture(s) may be blocked or obscured by a restrictor element. The restrictor element may be provided in and/or over the aperture(s). The aperture(s) may be provided in a surface of the cone formed by its truncation. The truncation surface may be planar. The truncation surface may be in contact with the burner. The restrictor(s) may be in contact with the burner. The truncation surface and/or restrictor(s) may be spaced from the burner. The porous electrical conductor may be spaced from the burner. A forcing unit may be provided to feed the fuel through the porous electrically conductive component. The forcing unit may be a fan. The fuel may fed through the porous electrically conductive component by convection.

The fuel may be introduced to the fuel cell(s) via a fuel preparation device. The fuel preparation device may have a raw fuel input and provide a fuel output. The raw fuel may be cleaned before outputting. The raw fuel may be converted before outputting. The raw fuel may be converted from a hydrogen including form to hydrogen. The raw fuel may be butane and/or propane. The fuel preparation device may include a convoluted path for the fuel between inlet and outlet. One or more outlets may be provided. Preferably at least one outlet is provided for each fuel cell.

Preferably the unconsumed oxidant and fuel are combined on the exhaust side. The unconsumed oxidant and fuel may be combined on the exhaust side together with the reaction products. The unconsumed oxidant and fuel may be combined in a burner. The burner may be a flame burner. The burner may be a catalytic burner, particularly a platinum based catalytic burner. The burner may be provided with an ignition device, such as a piezoelectric based device. The burner may be a planar element. The burner may provide a surface on which an item can be rested. The burner may provide a radiator.

At least a part of the wall providing the fuel preparation device may be an electrical conductor, preferably the electrical conductor which links the porous electrically conductive component to the fuel cells.

According to a fifth aspect of the invention we provide a method of producing a fuel cell, the method comprising forming an electrolyte component, forming a first electrode component and forming a second electrode component, inserting the formed electrolyte component into the formed first electrode component and inserting the formed second electrode component into the formed electrolyte component.

According to a sixth aspect of the invention we provide a method of producing a fuel cell, the method comprising forming an electrolyte component, forming a first electrically conductive component, forming a second electrode component and forming a second electrically conductive component, inserting the formed electrolyte component into the formed first electrically conductive component, inserting the second electrode component into the formed electrolyte component and inserting the formed second electrically conductive component into the second electrode component.

The fifth and/or sixth aspects of the invention may include any of the following features, options or possibilities and/or those set out elsewhere in this document.

Preferably the inner surface of the first electrically conductive component and outer surface of the electrolyte component and/or the inner surface of the electrolyte component and outer surface of the second electrically conductive and/or second electrode component have a first cross-sectional profile and a second cross-sectional profile separated from the first, the first cross-sectional profile having a greater area than the second cross-sectional profile, the first and second cross-sectional profiles being linked by one or more surfaces of the component.

Preferably the electrolyte component is pushed in to the first electrically conductive component. Preferably the material of the first electrically conductive component is compressed by the insertion of the electrolyte component.

Preferably the second electrically conductive component is pushed into the electrolyte component and/or second electrode component. Preferably the material of the second electrically conductive component is compressed by the insertion of the second electrically conductive component.

Preferably a porous material component is inserted into the second electrically conductive component. Preferably the porous material component is pushed in to the second electrically conductive component. Preferably the material of the second electrically conductive component and/or of the porous material component is compressed by the insertion.

One or more oxidant supply conduits may be attached to or lead to the first electrically conductive component.

One or more fuel supply conduits may be attached to or lead to the second electrically conductive component, or more preferably to the porous material component. A fuel preparation device may be attached to or form the fuel supply conduit(s).

A burner, particularly a catalytic burner may be provided on the exhaust side of the fuel cells.

BRIEF DESCRIPTION OF THE DRAWINGS

Various embodiments of the invention will now be described, by way or example only, and with reference to the accompanying drawings in which:

FIG. 1 illustrates a prior art fuel cell assembly of tubular design;

FIG. 2 illustrates in perspective view some of the components of an embodiment of the present invention.

DETAILED DESCRIPTION OF THE PREFERRED EMBODIMENTS

Figure 3:
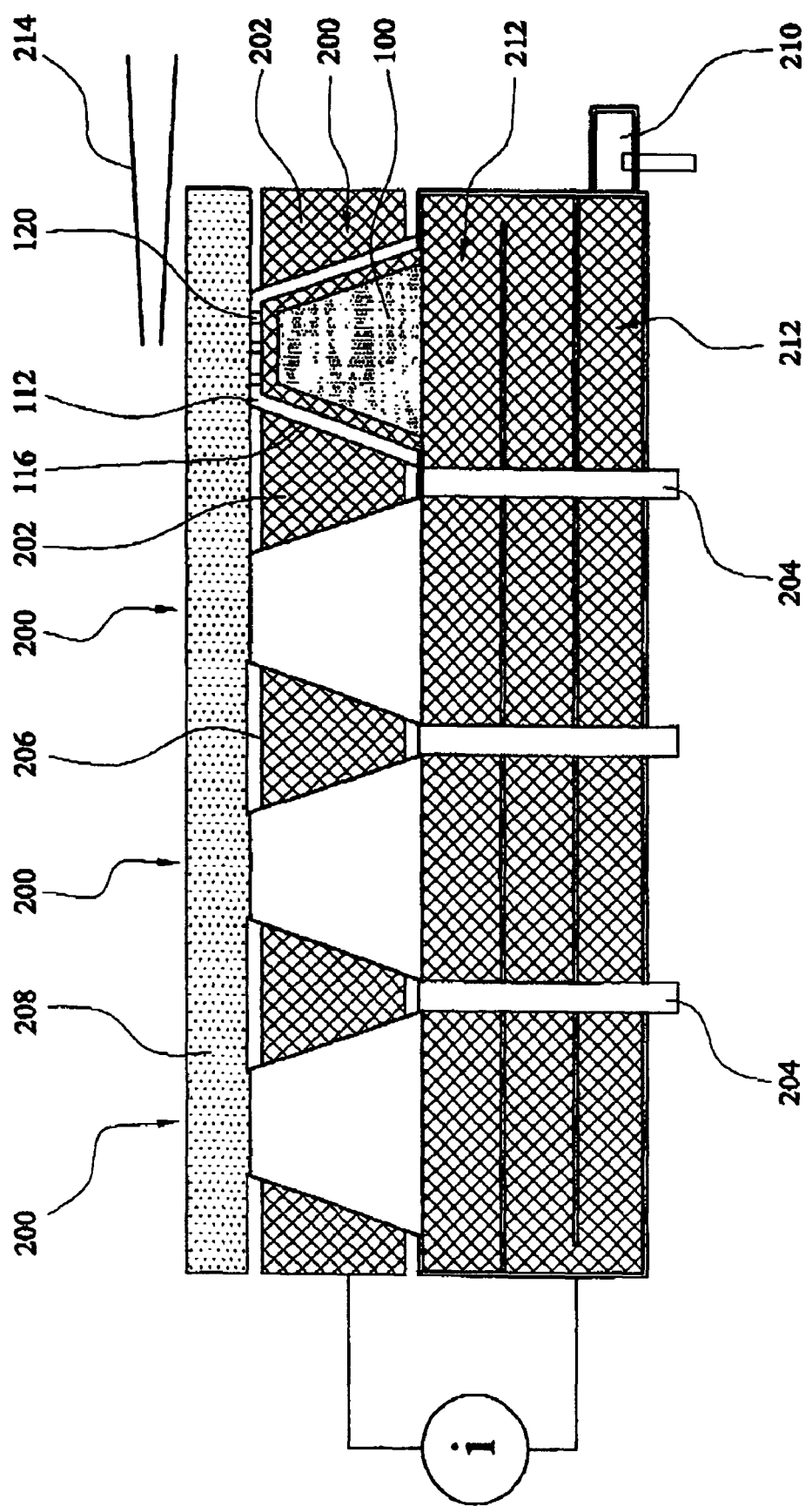
FIG. 3 illustrates a fuel cell assembled from components according to the FIG. 2 embodiment of the present invention, in partial cross-section.

In the fuel cell illustrated in FIG. 1 a hollow tube 2 is defined by a wall 4. The wall 4, all around its circumference is provided in an equivalent manner. The wall 4 is provided by a gas impermeable electrolyte layer, for instance of zirconia. Hydrogen 6, as the fuel, is fed into the hollow tube 2 via the fuel supply route 8 and oxygen 10, as the oxidant, is fed to the space 12 surrounding the outside of the hollow tube 2. The hollow tube 4 is extremely long in comparison with its internal diameter.

Negative oxygen ions are formed on the outside surface 14 at the cathode, which is bonded to wall 4 and flow inward and react with hydrogen ions produced at the inner surface 16 the anode, which is bonded to wall 4. A, current is generated by the flow of electrons, produced by the ionisation of the oxygen, around the circuit formed by the cell 4, the walls lit, 16, which provide the electrically conductive components on the anode and cathode surfaces respectively, and the wires 22, 24.

In practical devices the individual fuel cells are relatively small and power is obtained from a significant number of individual cells. Tubular fuel cells of the type described above generally have a higher resistance to thermal shock than planar fuel cells. Thermal shock occurs where the fuel cells are exposed to rapid temperature changes; a potential risk at any time where fuel cells may drop from their operating temperature (850° C. plus) to near ambient temperature.

Investigations by the applicant in to the behaviour of tubular fuel cells have established limitations on their performance. In particular the fuel cells have poor electrical performance and this is in large part believed by the applicant to result from problems in achieving good contact between the current collectors, gas impermeable layer and any other layers making up the cylindrical tube. The range of possibilities for addressing this issue in tubular designs is strictly limited. Attempts to increase the level of force which can be applied to the various components and layers during assembly, to force them together, are hindered by the difficulty of successfully accessing the inside of a small cylinder. Even the force applied to the outer surface is limited by the effectiveness of the support which can be provided internally to prevent the fuel cell collapsing.

The present invention addresses the above mentioned problem by redesigning the fuel cells configuration rather than through complicated techniques for applying greater force levels to tubular designs.

As illustrated in FIG. 2 the fuel cells in the present invention are formed of a number of components.

The core of a fuel cell is formed by a truncated cone 100 of a porous metal sponge, such as nickel. The core cone 100 has a planar upper surface 102 which is parallel to planar lower surface 104. The core cone 100 provides a porous media through which the fuel passes in use.

A second truncated cone 106 is provided around the core cone 100 in use. The cone 106 is hollow so as to receive the core cone 100 and the internal surface 108 has a common projected apex angle with the core cone 100. The second cone 106 also has common projected apex angles for both its internal surface 108 and external surface 110. The second cone 106 acts as a diffuser for the fuel to promote its efficient contact with a third cone 112 and complete the electrical circuit as the electrically conductive component. Nickel foam may be used to form the gas diffuser cone 106. The second cone 106 also has a planar top surface 111 and lower surface 113.

The third truncated cone 112 is a fuel cell and includes an electrolyte component which provides the gas impermeable barrier between the fuel and oxidant sides of the fuel cell. This electrolyte layer is generally of zirconia and particularly of zirconia doped with yttria. Again the barrier cone 112 is hollow and its internal surface 114 has a common projected apex angle with the external surface 110 of the second cone. The projected apex angle defining the internal surface 114 and external surface 116 of the barrier cone 112 are also equivalent to one another. Whilst impermeable to gas the barrier cone 112 allows the passage of gas ions. Provided on the internal surface 114 of the electrolyte is an anode. This electrode is provided as a layer in good contact both with the electrolyte and second cone 106. The top edge 118 of the barrier cone 112 defines an aperture 120. The aperture 120 allows fuel to exit the diffuser cone 106 and pass out of the fuel cell. The third cone 112 also has a planar top surface 119 and lower surface 121. On its external surface the third cone 112 is provided with a cathode. Again this layer is in good contact with the electrolyte.

The provision of the first, second and third cones in this way, (core cone 100, diffuser cone 106 and barrier cone 112), allows them to be readily manufactured separately by casting, moulding or other mass production processes. This is a considerable improvement over the extrusion process needed to produce multi-layer structures simultaneously. Furthermore, the matching surfaces of the cones provide good contact between the components when the cones are brought together. Additionally, the cones can be forced together still more effectively by applying compressive force to the base and top of the cones. The physical difficulties faced by the long tubular structures in bringing the components together are thus addressed.

The surrounding structure for such a fuel cell is illustrated in FIG. 3. In this illustration four equivalent fuel cells 200 are provided. The external surfaces 116 of the barrier cones (fuel cells) 112 are linked electrically to one another by a body of porous electrically conductive component 202, ideally a metal alloy, such as Inconel. An additional contact layer can be incorporated to improve electrical performance. This would ideally be a high chrome metal alloy. Metallic or ceramic compliant layers may be provided between the electrically conductive component 202 and the external surface 116 of the fuel cell. Such compliant layers may assist in ensuring even electrical connection across the electrode surface area, and/or improve gas diffusion and concentration profiles across the surface of the fuel cell. Such compliant layers may be of felt, wool or foam type porous media and preferably manufactured for materials suited to the atmospheric conditions seen at the electrode surface. Such materials would typically be nickel for the anode surface and high chromium alloy for the cathode surface. The body 202 and contact layer are gas porous to allow the passage of the oxidant through the structure and into contact with the external surface 116 of the barrier cone 112. The oxidant is fed to the through passages 204 unto the porous body 202. Fans or other means to force the oxidant through the structure may be provided, potentially driven by electricity developed by the structure itself. Alternatively and beneficially the air may be drawn through due to conductive effects arising from the burning of the exhaust gases. The unreacted oxidant exits the porous body 202 through the upper surface 206 and into the burner body 209.

The fuel, if it is in the form to be burnt, may be fed direct to the first cone 100. Alternatively, and as shown, more commonly available fuels than hydrogen itself can be accommodated by passing the fuel from its source and air using a venting device, through inlet 210 in to a body of catalytic material 212. During the passage through this material 212, for instance a platinum catalyst, a butane fuel may be converted into a hydrogen and carbon monoxide mixture. This can then be readily burnt by feeding it to the first cone 100. A sufficiently long pathway through the catalytic body 212 can be provided to give sufficient conversion of the fuel. The pathway can include a number of catalytic materials to achieve the desired conversion of the raw fuel. One or more scrubbing materials may also be provided to modify the fuel content. Obtaining the fuel in this way allows gas canisters and other commonly available portable fuel sources to be used.

The unconsumed fuel exiting the fuel cells through the aperture 120 in the top of the cone noes with the unconsumed oxidant exiting the upper surface 206 of the body 202. The aperture 120 may be unrestricted or may be provided in part with a gas restrictor of some kind. The restrictor may block of part of the aperture 120 to control the flow rate and/or route of gas (for instance to encourage its flow to the sides of the cones). A restrictor can also assist in preventing oxidant entering the fuel side of the cell. The exhaust mixture can be burnt as a flame or more conveniently can enter a catalytic burner body 208 where full burning without a flame occurs. The burning process provides sufficient heat output to maintain the fuel cells themselves at their operating temperature, 800° C. A piezoelectric ignition device 214 is provided to initially ignite the exhaust gases and when heat is built up in the fuel cells the generation of electricity will start by the process described above.

Attractively the result of the burning process is very low in nitrous oxides and in the main consists of water which could be condensed and used, even to drink.

The overall effect of the assembled structure is a substantial heat output from the plate style irradiator provided above the burner 208 which can be used and a significant power output, 100 W or so from a 10 cm by 10 cm array of such fuel cells. Conveniently the power is at a single voltage as the fuel cells are provided in parallel. The system could be provided as part of a heating device, such as a cooking stove, radiator or the like, and offer the addition possibility of providing electrical power. A dual function highly portable device is thus offered.

Whilst the invention is exemplified above by truncated cones, a variety of other forms having a progressive taper can be used, such as domes, planar raced cones (pyramids) and other such structures. The taper need not be even. Furthermore, the cone or other shape can have a fairly substantial apex angle, up to around 100° to 120°, and hence be relatively flat whilst still maintaining the thermal shock resistance advantages over the planar fuel cells. Additionally a variety configurations for such devices is envisaged including stacks with one or more common features, such as a common exhaust gas burner for two layers of fuels cells.

The invention as detailed above provides useful power levels in practical size fuel cell arrays. Furthermore, the fuel cells can be incorporated in existing heating devices to provide a useful secondary function in terms of electricity generation. As efficiency is not such an issue in these devices the design can be simplified in not needing complex seal arrangements. The system is suitable for emergency power generation, power generation in remote locations, battery recharging or the like. The device is also highly portable and less fragile than alternative devices offering such a function, such as solar panels.

The invention claimed is:

1. A fuel cell comprising:
    a first cone, the first cone comprising:
        an electrolyte component having a first side and a second side;
        a first electrode component provided on the outside of the electrolyte component and contacting a first side of the electrolyte component; and
        a second electrode component provided on the inside of the electrolyte component and contacting a second side of the electrolyte component;
    a second cone, the second cone comprising:
        a second electrically conductive component which is provided inside the electrolyte component and in contact with the second electrode; and
    a third cone, the third cone comprising:
        a porous material component provided inside the second electrically conductive component and in contact with the second electrically conductive component; and
    wherein at least one of the components has a first cross-sectional profile at a first location and a second cross-sectional profile at a second location, the second location being separated from the first location, the first cross-sectional profile having a greater area than the second cross-sectional profile, the first and second cross-sectional profiles being linked by one or more surfaces of the component.

2. A fuel cell according to claim 1 further comprising a first electrically conductive component provided outside the electrolyte component in contact with the first electrode.

3. A fuel cell according to claim 1 in which the profiles are linked by a single surface, the linking surface being conical in shape.

4. A fuel cell according to claim 1 in which the profiles are linked by one or more surfaces and the linking surfaces provide the transition in a constant manner from the first cross-sectional profile to the second cross-sectional profile.

5. A fuel cell according to claim 1 in which the profiles are linked by one or more surfaces, the linking surfaces being angled relative to an axis, with an interception angle of between 1° and 65°.

6. An array of fuel cells, the array including one or more fuel cells according to claim 1 connected to one or more further fuel cells.

7. An array according to claim 6 in which the fuel cells, through their outer surfaces, are connected together by a porous electrically conductive link component, which is porous to the passage of the oxidant including oxygen.

8. An array according to claim 7 in which the porous electrically conductive link component is provided with one or more tapering openings therein.

9. An array according to claim 7 wherein the porous electrically conductive link component connects the fuel cells in parallel or series.

10. An array according to claim 7 wherein the porous electrically conductive link component has an oxidant feed side and an exhaust side.

11. A fuel cell comprising:
- an electrolyte component having a first side and a second side;
- a first electrode component provided outside the electrolyte component and contacting the first side of the electrolyte component;
- a first electrically conductive component contacting the first electrode component;
- a second electrode provided inside the electrolyte component and contacting the second side of the electrolyte component;
- a second electrically conductive component contacting the second electrode component; and
- a porous material component provided inside the second electrically conductive component and contacting the second electrically conductive component;
- wherein at least one of the components has a first cross-sectional profile at a first location and a second cross-sectional profile at a second location, the second location being separated from the first location, the first cross-sectional profile having a greater area than the second cross-sectional profile, the first and second cross-sectional profiles being linked by one or more surfaces of the component.

12. A fuel cell according to claim 11 in which the first electrically conductive component is provided outside the electrolyte component in contact with the first electrode.

13. A fuel cell according to claim 11 in which the profiles are linked by a single surface, the linking surface being conical in shape.

14. A fuel cell according to claim 11 in which the profiles are linked by one or more surfaces and the linking surfaces provide the transition in a constant manner from the first cross-sectional profile to the second cross-sectional profile.

15. A fuel cell according to claim 11 in which the profiles are linked by one or more surfaces, the linking surfaces being angled relative to an axis, with an interception angle of between 10° and 65°.

16. An array of fuel cells, the array including one or more fuel cells according to claim 11 connected to one or more further fuel cells.

17. A method of producing a fuel cell, the method comprising:
- inserting an electrolyte component having an inner surface and an outer surface into a first electrode component having an inner surface;
- inserting a second electrode component having an inner surface and an outer surface into the electrolyte component having the inner surface;
- inserting a second electrically conductive component having an inner surface and an outer surface into the second electrode component having an inner surface; and
- inserting a porous material component having an outer surface into the second electrically conductive component.

18. A method according to claim 17 in which the inner surface of the first electrically conductive component and outer surface of the electrolyte component and/or the inner surface of the electrolyte component and outer surface of the second electrically conductive component and/or second electrode component have a first cross-sectional profile and a second cross-sectional profile separated from the first, the first cross-sectional profile having a greater area than the second cross-sectional profile, the first and second cross-sectional profiles being linked by one or more surfaces of the component.

19. A method according to claim 17 in which the electrolyte component is pushed into the first electrically conductive component and/or the second electrically conductive component is pushed into the electrolyte component and/or second electrode component and/or a porous material component is pushed into the second electrically conductive component.

* * * * *